(12) United States Patent
Takahashi et al.

(10) Patent No.: US 10,448,045 B2
(45) Date of Patent: **\*Oct. 15, 2019**

(54) VIDEO ENCODING METHOD AND VIDEO DECODING METHOD

(71) Applicant: MAXELL, LTD., Kyoto (JP)

(72) Inventors: Masashi Takahashi, Tachikawa (JP); Muneaki Yamaguchi, Inagi (JP)

(73) Assignee: MAXELL, LTD., Kyoto (JP)

( \* ) Notice: Subject to any disclaimer, the term of this patent is extended or adjusted under 35 U.S.C. 154(b) by 0 days.

This patent is subject to a terminal disclaimer.

(21) Appl. No.: 16/120,680

(22) Filed: Sep. 4, 2018

(65) Prior Publication Data

US 2018/0376163 A1 Dec. 27, 2018

Related U.S. Application Data

(63) Continuation of application No. 15/825,900, filed on Nov. 29, 2017, now Pat. No. 10,097,856, which is a (Continued)

(30) Foreign Application Priority Data

Sep. 29, 2008 (JP) .................................. 2008-249515

(51) Int. Cl.
*H04N 19/52* (2014.01)
*H04N 19/176* (2014.01)
(Continued)

(52) U.S. Cl.
CPC ........... *H04N 19/52* (2014.11); *H04N 19/172* (2014.11); *H04N 19/176* (2014.11);
(Continued)

(58) Field of Classification Search
CPC .... H04N 19/52; H04N 19/176; H04N 19/172; H04N 19/517; H04N 19/61;
(Continued)

(56) References Cited

U.S. PATENT DOCUMENTS 5,510,841 A 4/1996 Iwamura
6,020,933 A 2/2000 Lee
(Continued)

FOREIGN PATENT DOCUMENTS

JP 5-227522 9/1993
JP 11-122620 4/1994
(Continued)

OTHER PUBLICATIONS

Sung Deuk Kim et al., An Efficient Motion Vector Coding Scheme Based on Minimum Bitrate Prediction, IEEE Transactions on Image Processing, vol. 8, No. 8, Aug. 1999, pp. 1117-1120.
(Continued)

*Primary Examiner* — Hee-Yong Kim
(74) *Attorney, Agent, or Firm* — Mattingly & Malur, PC

(57) ABSTRACT

Provided is a video encoding/decoding technique for improving the compression efficiency by reducing the motion vector code amount. In a video decoding process, the prediction vector calculation method is switched from one to another in accordance with a difference between predetermined motion vectors among a plurality of motion vectors of a peripheral block of a block to be decoded and already decoded. The calculated prediction vector is added to a difference vector decoded from an encoded stream so as to calculate a motion vector. By using the calculated motion vector, the inter-image prediction process is executed.

2 Claims, 15 Drawing Sheets

Related U.S. Application Data continuation of application No. 14/842,020, filed on Sep. 1, 2015, now Pat. No. 9,854,265, which is a continuation of application No. 14/169,301, filed on Jan. 31, 2014, now Pat. No. 9,131,218, which is a continuation of application No. 13/058,560, filed as application No. PCT/JP2009/002460 on Jun. 2, 2009, now Pat. No. 8,693,546.

(51) Int. Cl.
| | | |
|---|---|---|
| *H04N 19/172* | (2014.01) | |
| *H04N 19/517* | (2014.01) | |
| *H04N 19/61* | (2014.01) | |
| *H04N 19/577* | (2014.01) | |
| *H04N 19/513* | (2014.01) | |
| *H04N 19/51* | (2014.01) | |
| *H04N 19/184* | (2014.01) | |
| *H04N 19/13* | (2014.01) | |

(52) U.S. Cl.
CPC ........... *H04N 19/184* (2014.11); *H04N 19/51* (2014.11); *H04N 19/513* (2014.11); *H04N 19/517* (2014.11); *H04N 19/577* (2014.11); *H04N 19/61* (2014.11); *H04N 19/13* (2014.11)

(58) Field of Classification Search
CPC .... H04N 19/577; H04N 19/513; H04N 19/51; H04N 19/184
USPC .................................................... 375/240.16
See application file for complete search history.

(56) References Cited

U.S. PATENT DOCUMENTS

| | | |
|---|---|---|
| 6,498,810 B1 | 12/2002 | Kim et al. |
| 2001/0026590 A1 | 10/2001 | Kang et al. |
| 2003/0128762 A1 | 6/2003 | Nakagawa et al. |
| 2003/0174776 A1 | 9/2003 | Shimizu et al. |
| 2004/0013309 A1 | 1/2004 | Choi et al. |
| 2004/0264573 A1 | 12/2004 | Bossen |
| 2006/0245497 A1 | 11/2006 | Tourapis et al. |
| 2008/0130747 A1 | 6/2008 | Moriya et al. |
| 2009/0116759 A1 | 5/2009 | Suzuki |
| 2009/0129472 A1 | 5/2009 | Panusopone |
| 2009/0147855 A1 | 6/2009 | Song et al. |
| 2010/0158120 A1 | 6/2010 | Fang |
| 2011/0211640 A1 | 9/2011 | Kim |
| 2011/0317930 A1* | 12/2011 | Kim .......................... G06T 9/00 382/233 |

FOREIGN PATENT DOCUMENTS

| | | |
|---|---|---|
| JP | 10-224800 | 8/1998 |
| JP | 11-112994 | 4/1999 |
| JP | 2000-138935 | 5/2000 |
| JP | 2006-271001 | 10/2006 |
| JP | 2008-211697 | 9/2008 |

OTHER PUBLICATIONS

EP Search Report in EP App. No. 09815792.8-1908, dated Jul. 16, 2013.
JP Office Action received in JP App. No. 2008-249515, dated Jan. 29, 2013.
Liu et al., Adaptive Motion Vector Prediction Based on Spatiotemporal Correlation, International Conference on WiCOM, Sep. 2006.
JP Office Action received in corresponding Japanese Application No. 2013-242473 dated Mar. 10, 2015.
European Communication pursuant to Article 94(3) EPC received in corresponding European Application No. 09 815 792.8 dated Feb. 22, 2016.

* cited by examiner

PREDICTIVE MOTION VECTOR PMV = Median (MV$_A$, MV$_B$, MV$_C$) —605

DIFFERENTIAL MOTION VECTOR DMV = MV − PMV —606

| OPTIONS: 2 (CASE2) | |
|---|---|
| SELECTED VALUE | CODE |
| b | 0 |
| c | 1 |

| OPTIONS: 3 (CASE4) | |
|---|---|
| SELECTED VALUE | CODE |
| g | 0 |
| f | 10 |
| h | 11 |

| OPTIONS: 5 (CASE7) | |
|---|---|
| SELECTED VALUE | CODE |
| g | 00 |
| f | 01 |
| h | 10 |
| k | 110 |
| l | 111 |

FIG. 11

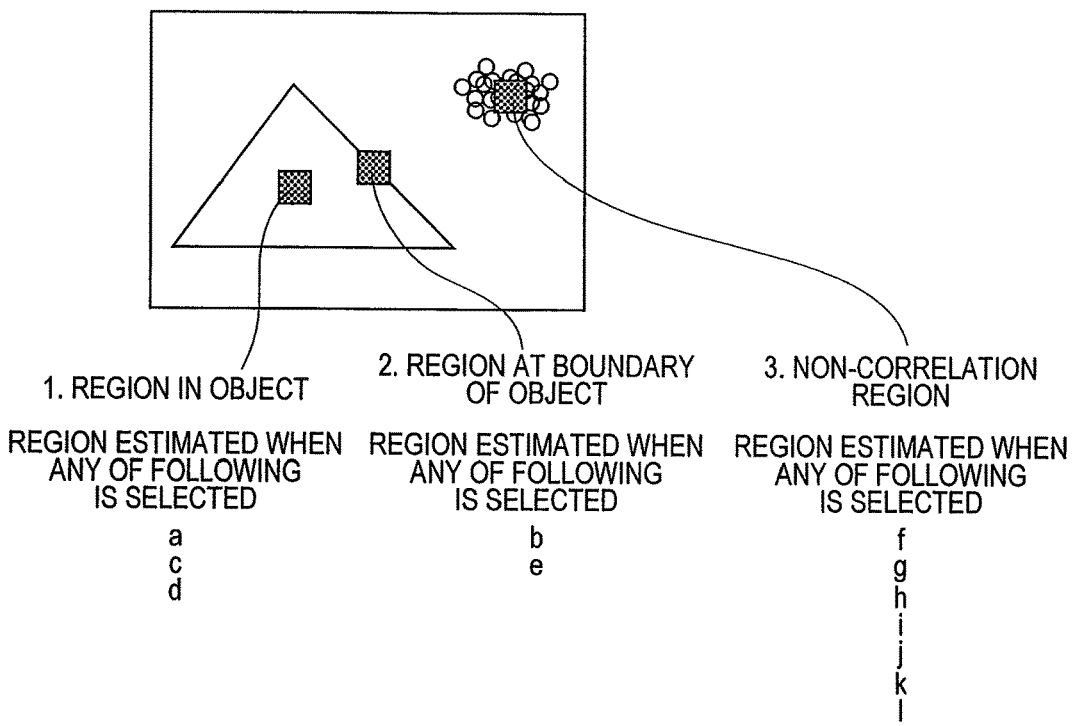

1. REGION IN OBJECT

REGION ESTIMATED WHEN ANY OF FOLLOWING IS SELECTED a
c
d

2. REGION AT BOUNDARY OF OBJECT

REGION ESTIMATED WHEN ANY OF FOLLOWING IS SELECTED b
e

3. NON-CORRELATION REGION

REGION ESTIMATED WHEN ANY OF FOLLOWING IS SELECTED f
g
h
i
j
k
l

FIG. 12

HIGH ACCURACY OF PREDICTION MEANS
SMALL MAGNITUDE OF DIFFERENTIAL MOTION VECTOR                      1201

1. REGION IN OBJECT > 2. REGION AT BOUNDARY OF OBJECT > 3. NON-CORRELATION REGION

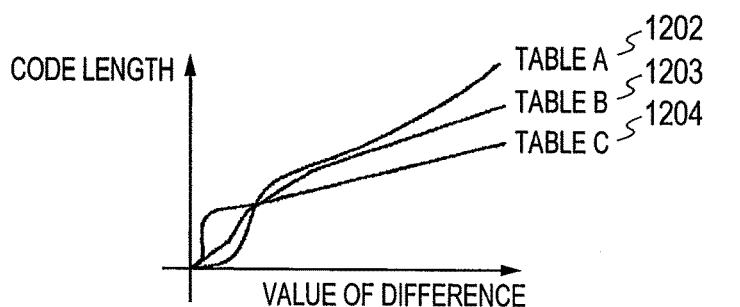

TABLE A — 1202
TABLE B — 1203
TABLE C — 1204

WITCHING OF VARIABLE LENGTH CODE TABLES — 1205

1. REGION IN OBJECT
(WHEN ANY OF CANDIDATE VECTOR COMPONENTS a, c AND d IS SELECTED)         ⇒ TABLE A

2. REGION AT BOUNDARY OF OBJECT
(WHEN ANY OF CANDIDATE VECTOR COMPONENTS f, g, h, i, j, k AND l IS SELECTED)   ⇒ TABLE B

3. NON-CORRELATION REGION
(WHEN ANY OF CANDIDATE VECTOR COMPONENTS a, c AND d IS SELECTED)         ⇒ TABLE C

FIG. 13

TABLE A 1301

| DIFFERENTIAL MOTION VECTOR | CODE | CODE LENGTH |
|---|---|---|
| 0 | 0 | 1 |
| +1 | 100 | 3 |
| -1 | 101 | 3 |
| +2 | 11000 | 5 |
| -2 | 11001 | 5 |
| +3 | 11010 | 5 |
| -3 | 11011 | 5 |
| +4 | 1110000 | 7 |
| -4 | 1110001 | 7 |
| +5 | 1110010 | 7 |
| -5 | 1110011 | 7 |
| +6 | 1110100 | 7 |
| -6 | 1110101 | 7 |
| ... | ... | ... |

TABLE B 1302

| DIFFERENTIAL MOTION VECTOR | CODE | CODE LENGTH |
|---|---|---|
| 0 | 00 | 2 |
| +1 | 0100 | 4 |
| -1 | 0101 | 4 |
| +2 | 0110 | 4 |
| -2 | 0111 | 4 |
| +3 | 1000 | 4 |
| -3 | 1001 | 4 |
| +4 | 101000 | 6 |
| -4 | 101001 | 6 |
| +5 | 101010 | 6 |
| -5 | 101011 | 6 |
| +6 | 101100 | 6 |
| -6 | 101101 | 6 |
| ... | ... | ... |

TABLE C 1303

| DIFFERENTIAL MOTION VECTOR | CODE | CODE LENGTH |
|---|---|---|
| 0 | 000 | 3 |
| +1 | 0010 | 4 |
| -1 | 0011 | 4 |
| +2 | 01000 | 5 |
| -2 | 01001 | 5 |
| +3 | 01010 | 5 |
| -3 | 01011 | 5 |
| +4 | 01100 | 5 |
| -4 | 01101 | 5 |
| +5 | 01110 | 5 |
| -5 | 01111 | 5 |
| +6 | 10000 | 5 |
| -6 | 10001 | 5 |
| ... | ... | ... |

| TABLE SET SYMBOL | TABLE NUMBER | | |
|---|---|---|---|
| | TABLE A | TABLE B | TABLE C |
| a | 1 | 2 | 4 |
| b | 1 | 3 | 5 |
| c | 2 | 3 | 5 |

1402

| DIFFERENTIAL MOTION VECTOR | CODE LENGTH | | | | |
|---|---|---|---|---|---|
| | TABLE 1 | TABLE 2 | TABLE 3 | TABLE 4 | TABLE 5 |
| 0 | 1 | 2 | 2 | 3 | 3 |
| +1 | 3 | 3 | 4 | 4 | 4 |
| −1 | 3 | 3 | 4 | 4 | 4 |
| +2 | 5 | 5 | 4 | 4 | 5 |
| −2 | 5 | 5 | 4 | 4 | 5 |
| +3 | 5 | 5 | 4 | 4 | 5 |
| −3 | 5 | 5 | 4 | 4 | 5 |
| +4 | 7 | 5 | 6 | 5 | 5 |
| −4 | 7 | 5 | 6 | 5 | 5 |
| +5 | 7 | 7 | 6 | 5 | 5 |
| −5 | 7 | 7 | 6 | 5 | 5 |
| +6 | 7 | 7 | 6 | 6 | 5 |
| −6 | 7 | 7 | 6 | 6 | 5 |
| ... | ... | ... | ... | ... | ... |

1403

SWITCHING OF TABLE SETS
WHEN PrevAddBits ≤ Thre3
TABLE SET a IS USED
WHEN Thre3 < PrevAddBits < Thre4
TABLE SET b IS USED
WHEN PrevAddBits ≥ Thre4
TABLE SET c IS USED

VIDEO ENCODING METHOD AND VIDEO DECODING METHOD

This is a continuation application of U.S. application Ser. No. 15/825,900, filed Nov. 29, 2017, which is a continuation application of U.S. application Ser. No. 14/842,020, filed Sep. 1, 2015, now U.S. Pat. No. 9,854,265, which is a continuation application of U.S. application Ser. No. 14/169,301, filed Jan. 31, 2014, now U.S. Pat. No. 9,131,215, which is a continuation application of U.S. application Ser. No. 13/058,560, filed Feb. 11, 2011, now U.S. Pat. No. 8,693,546, which is a national stage of PCT/JP2009/002460, filed on Jun. 2, 2009, which claims priority to JP 2008-249515, filed Sep. 29, 2008. The entire disclosures of all of these applications are hereby incorporated by reference.

TECHNICAL FIELD

The present invention relates to a technique for encoding a video (dynamic image) and a technique for decoding a video (dynamic image).

BACKGROUND ART

As a method for digitalizing, recording and transmitting a large amount of video information, encoding formats such as Moving Picture Experts Group (MPEG) have been established. For example, MPEG-1 format, MPEG-2 format, MPEG-4 format H.264/Advanced Video Coding (AVC) format and the like have been established as international standard encoding formats. These formats are used for digital satellite broadcasting, digital versatile discs (DVD), mobile phones, digital cameras and the like as encoding formats. The range of use of the formats has been expanded, and the formats are more commonly used.

According to the formats, an image to be encoded is predicted on a block basis using information on an encoded image, and the difference (prediction difference) between an original image and the predicted image is encoded. In the formats, by removing redundancy of video, the amount of coded bits is reduced. Especially, in inter-prediction in which an image that is different from an image to be encoded is referenced, a block that highly correlates with a block to be encoded is detected from the referenced image. Thus, the prediction is performed with high accuracy. In this case, however, it is necessary to encode the prediction difference and the result of detecting the block as a motion vector. Thus, an overhead may affect the amount of coded bits.

In H.264/AVC format, a technique for predicting the motion vector is used in order to reduce the amount of coded bits for the motion vector. That is, in order to encode the motion vector, the motion vector of a block to be encoded is predicted using an encoded block that is located near the block to be encoded. Variable length coding is performed on the difference (differential motion vector) between the predictive motion vector and the motion vector.

SUMMARY OF THE INVENTION

Problem to be Solved by the Invention

However, the accuracy of predicting a motion vector in conventional H.264/AVC format is not sufficient. A large amount of coded bits for a motion vector are still necessary.

An object of the present invention is to reduce the amount of coded bits for a motion vector and improve the efficiency of compression.

Means for Solving the Problem

A video encoding method and a video decoding method according to the present invention are provided, for example, as described in claims.

Effect of the Invention

According to the present invention, it is possible to reduce the amount of coded bits for a motion vector and improve the efficiency of compression.

BRIEF DESCRIPTION OF THE DRAWINGS

FIG. 11 is a conceptual diagram showing an example of a code table switching technique according to the first embodiment of the present invention.

FIG. 12 is a conceptual diagram showing an example of the code table switching technique according to the first embodiment of the present invention.

FIG. 13 is a diagram showing an example of code tables according to the first embodiment of the present invention.

FIG. 14 is a diagram showing an example of the code tables according to the first embodiment of the present invention.

MODE FOR CARRYING OUT THE INVENTION

Embodiments of the present invention are described with reference to the accompanying drawings.

Figure 5:
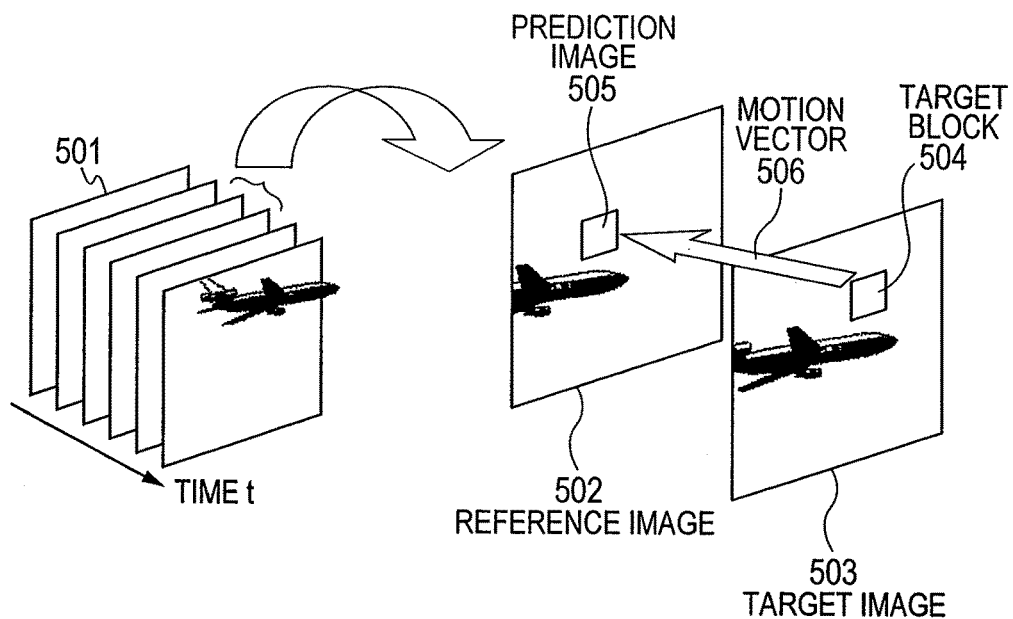
FIG. 5 is a conceptual diagram showing inter-prediction using H.264/AVC format.

FIG. 5 is a conceptual diagram showing an operation of an inter-prediction process according to H.264/AVC format. In H.264/AVC format, an image to be encoded is encoded on a block basis in order of raster scanning. In order to perform inter-prediction, an encoded image that is included in a video sequence (501) is treated as a reference image (502), while the video sequence (501) includes a target image (503) to be encoded. A block (prediction image) (505) highly correlates with a target block (504) that is included in the target image. The block (505) is detected from the reference image. In this case, the difference between the two blocks is calculated as a prediction difference. The prediction difference is encoded, while the difference between coordinate values of the two blocks is treated as a motion vector (506) and is encoded. In order to perform decoding, in contrast, the aforementioned procedures are performed in the reverse order. The prediction difference is decoded and then added to the block (prediction image) (505) included in the reference image, thereby acquiring a decoded image.

Figure 6:
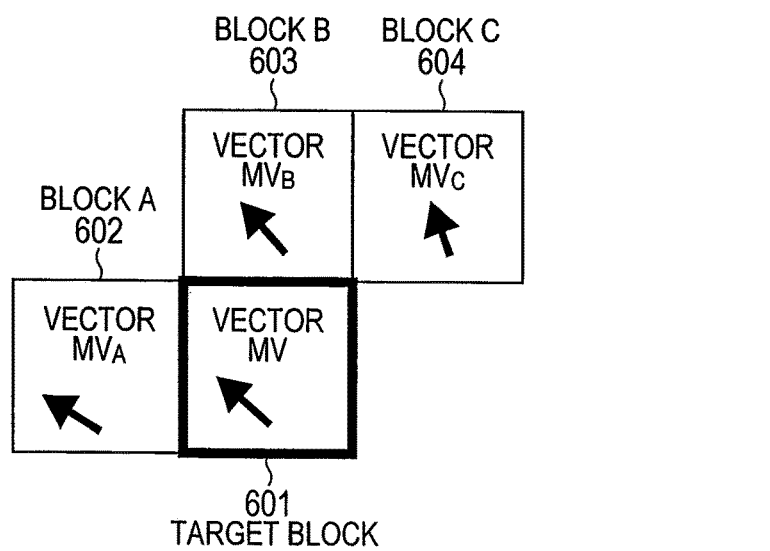
FIG. 6 is a conceptual diagram showing a technique for predicting a motion vector, while the technique is used with H.264/AVC format.

In H.264/AVC format, a technique for predicting a motion vector is used in order to reduce an overhead due to the amount of coded bits for a motion vector as described above. Specifically, in order to encode the motion vector, the motion vector of a block to be encoded is predicted using an encoded block located near the block to be encoded, and the difference (differential motion vector) between the predictive motion vector and the motion vector is encoded. In this case, the magnitude of the differential motion vector is equal to or nearly equal to 0 according to statistics. Thus, the amount of coded bits can be reduced by performing variable length coding on the differential motion vector. FIG. 6 is a conceptual diagram showing a method for calculating the predictive motion vector. A block A (602) that has been encoded is located on the left side of a target block (601) to be encoded. A block B (603) that has been encoded is located on the upper side of the block (601) to be encoded. A block C (604) that has been encoded is located on the upper right side of the block (601) to be encoded. Motion vectors of the blocks A, B and C are indicated by MVA, MVB and MVC, respectively.

In this case, in H.264/AVC format, a predictive motion vector is calculated as a median of the motion vectors MVA, MVB and MVC. Specifically, the predictive motion vector PMV is calculated using a function Median (605) that returns the median of components of vectors specified as arguments. In addition, a differential motion vector DMV is calculated as the difference (606) between the motion vector MV of the block to be encoded and the predictive motion vector PMV. Then, variable length coding is performed on the differential motion vector DMV. Decoding is performed in the reverse order thereof. Specifically, the differential motion vector DMV is decoded and added to the predictive motion vector PMV calculated in the aforementioned manner, thereby decoding the motion vector MV.

As described above, in H.264/AVC format, the technique for predicting a motion vector is used, so that the amount of coded bits necessary for the motion vector is significantly reduced. However, when it is difficult to accurately predict a motion vector (i.e., when multiple movable objects are located close to each other or when a boundary between movable objects is present near a target region), the accuracy of predicting a motion vector according to H.264/AVC format is not sufficient, and a large amount of coded bits for the motion vector are still necessary. The reason can be considered as follows. That is, when a motion is complicated like the aforementioned circumstances, correlations between motion vectors of blocks located near the target region are significantly reduced, and the difference between vectors that are candidates for predictive motion vectors is large. Thus, if a predictive motion vector were erroneously selected, the differential motion vector would be large compared with the case where an appropriate predictive motion vector is selected. As a result, the amount of coded bits is significantly increased.

In an embodiment of the present invention, a method for determining a predictive motion vector is switched among methods for determining the predictive motion vector on the basis of a distribution of the values of vectors that are candidates for the predictive motion vector. When the range of the distribution of the candidate vectors is small, it is determined that a risk existing when a predictive motion vector is erroneously selected is small, and a conventional prediction method is performed. In contrast, when the range of the distribution of the candidate vectors is large, a bit (hereinafter referred to as added bit) that represents a candidate vector to be used as the predictive motion vector is added, and the candidate vector is specified so that the differential motion vector is minimized.

In this case, when the type of the vector that is a candidate for the predictive motion vector is dynamically changed on the basis of the distribution of the candidate vectors, it is possible to suppress an increase in the amount of coded bits due to the added bit or bits. Therefore, while it is possible to suppress an increase in the amount of coded bits, it is possible to improve the accuracy of predicting a motion vector.

In general, when a motion is complicated, the accuracy of predicting a motion vector is reduced. Even when the optimal predictive motion vector is selected, the differential motion vector is not small. Thus, in order to reduce the amount of coded bits, it is effective to change, on the basis of whether or not a motion is complicated, a method for encoding the differential motion vector.

For example, in Reference Document 1, it is determined whether or not a motion is complicated on the basis of the magnitude of dispersion of motion vectors of blocks located near a target block, and a variable length code table is switched, on the basis of the determination result, among variable length code tables that are used in order to encode a differential motion vector. In this method, it can be roughly determined whether or not a motion is complicated. However, a code table cannot be exactly switched among the tables so that the switching reflects characteristics of an image. In addition, the switching of the code table in this method is performed on the basis of the motion vectors of the blocks located near the target block. Thus, when a motion in a target region is different from a motion in a region located near the target region, a code table cannot be appropriately selected.

According to the embodiment of the present invention, in a method for selecting the optimal vector using the aforementioned added bit or bits, a characteristic of a motion in a target region can be predicted in detail by specifying a selected candidate vector, and a code table is switched among code tables on the basis of the predicted information. Thus, it is possible to more accurately switch a code table among the code tables. As a result, it is possible to further reduce the amount of coded bits.

[Reference Document 1] JP-A-2006-271001

A process of encoding a motion vector according to the present invention and a process of decoding a motion vector according to the present invention are described below. A process of calculating a predictive motion vector PMV in the encoding process is performed in the same manner as a process of calculating a predictive motion vector PMV in the decoding process. In the encoding process, the difference (differential motion vector) DMV between a motion vector MV and a predictive motion vector PMV is calculated and encoded. In the decoding process, in contrast, the differential motion vector DMV is decoded, the predictive motion vector PMV is added to the decoded differential motion vector DMV, and the motion vector MV is decoded.

First Embodiment

Figure 7:
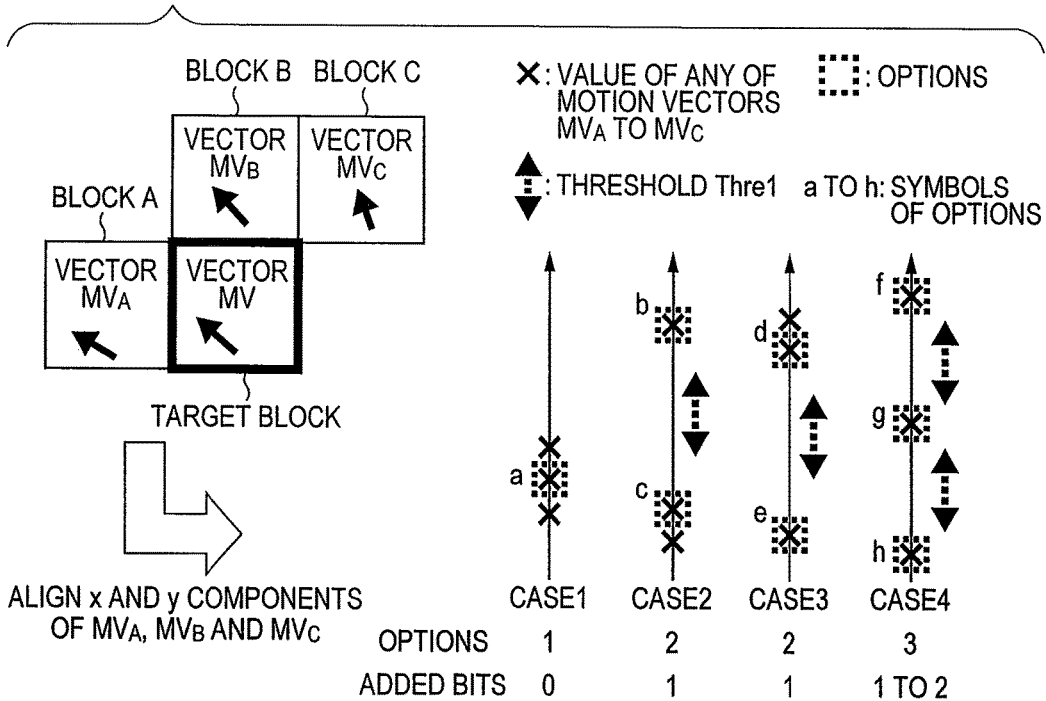
FIG. 7 is a conceptual diagram showing an example of a technique for predicting a motion vector according to the first embodiment of the present invention.

FIG. 7 is a conceptual diagram showing an example of the predictive motion vector calculating method according to the present embodiment. In FIG. 7, vectors that are candidates for a predictive motion vector are vectors (of three types) of blocks A, B and C. The block A is located on the left side of a target block. The block B is located on the upper side of the target block. The block C is located on the upper right side of the target block. In this case, a motion vector of the block A is indicated by MVA; a motion vector of the block B is indicated by MVB; and a motion vector of the block C is indicated by MVC.

First, x and y components of the motion vectors MVA, MVB and MVC are aligned. A distribution of the motion vectors is examined using a threshold Thre1 on the basis of four types of cases CASE1 to CASE4. In FIG. 7, the directions of arrows are directions in which the components (of the motion vectors) that have large values extend. Among the x and y components of the motion vectors MVA, MVB and MVC indicated by symbols x, a component that is closest to a location pointed by each of the arrows has the maximum value, while a component that is farthest from the location pointed by each of the arrows has the minimum value. A component located between both the components has an intermediate value.

When an interval between each pair of all the values is smaller than the threshold Thre1 (CASE1) and any value is selected from among the values, the magnitude of the differential motion vector does not significantly vary. Thus, in the same manner as H.264/AVC format, a median (a) among the candidate values is selected as the predictive motion vector PMV. In this case, an added bit is not generated. In this case, it is not necessary to select the median. For example, the average value, the maximum value, the minimum value or the like may be selected as the predictive motion vector using any calculation method. A motion vector of a block other than the blocks A, B and C may be used to determine the predictive motion vector. For example, a motion vector of a block located on the upper left side of the target block may be used to determine the predictive motion vector. In addition, the following motion vector may be used to determine the predictive motion vector: a motion vector of a block that is located at the same position as the target block and is included in a frame that chronologically precedes a frame including the target block.

In contrast, in the case CASE2 in which the difference between the maximum value among the candidate values and the median is equal to or larger than the threshold Thre1 and the difference between the minimum value and the median is smaller than the threshold Thre1, when it is optimal to select the minimum value as the predictive motion vector and the median is selected as the predictive motion vector, for example, the magnitude of the differential motion vector does not significantly vary. In the case CASE2, however, if the maximum value is selected when it is necessary to select the median, the magnitude of the differential motion vector is significantly increased. Thus, in the case CASE2, options for the predictive motion vector PMV are the maximum value (b) and the median (c), and the maximum value (b) or the median (c) is selected as the predictive motion vector PMV so that the selected value results in a smaller differential motion vector. Whether the maximum value or the median is selected is represented by information of one bit. In the decoding process, the predictive motion vector is specified on the basis of the one-bit information and the specified predictive motion vector is added to the differential motion vector, thereby decoding the motion vector.

Similarly, when the difference between the minimum value and a median is equal to or larger than the threshold Thre1, and the difference between the maximum value and the median is smaller than the threshold Thre1 (CASE3), the median (d) or the minimum value (e) is selected as the predictive motion vector PMV so that the selected value results in a smaller differential motion vector. Then, one-bit information is added.

When all intervals between the values are equal to or larger than the threshold Thre1 (CASE4), a value is selected as the predictive motion vector from among three candidate values that are the maximum value (f), a median (g), and the minimum value (h) so that the selected value results in the smallest differential motion vector, and information of one or two bits is added.

The methods for setting the options for the predictive motion vector are not limited. In the case CASE4, for example, since the number of the options is three, the two added bits are necessary in some cases. The options may be limited to the two types of the motion vectors MVA and MVB, for example. In this case, it is always possible to suppress the added bits to one bit.

In the aforementioned method, the predictive motion vector can be represented by means of the added bit of the minimum data amount only when it is highly likely that the accuracy of prediction is reduced. Thus, the accuracy of predicting a motion vector can be improved while it is possible to suppress an increase in the amount of coded bits.

When the aforementioned method is performed together with a method described below with reference to FIG. 8, the accuracy of the prediction can be further increased. A threshold Thre2 that is set as a value larger than the threshold Thre1 is used. A distribution of the motion vectors is examined using the threshold Thre2 on the basis of three types of cases CASE5 to CASE7 as well as the cases CASE1 to CASE4.

Specifically, when the difference between the values (b) and (c) in the case CASE2 is equal to or larger than the threshold Thre2 (CASE5), an intermediate value (i) is added between the values (b) an (c) as an option for the predictive motion vector. A value is selected as the predictive motion value from among the values (b), (c) and (i) so that the selected value results in the smallest differential motion vector. Information of one or two bits is added.

In addition, when the difference between the values (d) and (e) in the case CASE3 is equal to or larger than the threshold Thre2 (CASE6), an intermediate value (j) is added between the values (d) and (e) as an option for the predictive motion vector. A value is selected as the predictive motion vector from among the values (d), (e) and (j) so that the selected value results in the smallest differential motion vector. Information of one or two bits is added.

In addition, when the difference between the values (f) and (g) in the case CASE4 and the difference between the values (g) and (h) are equal to or larger than the threshold Thre2 (CASE7), an intermediate value (k) is added between the values (f) and (g) as an option for the predictive motion vector and an intermediate value (l) is added between the values (g) and (h) as an option for the predictive motion vector. A value is selected as the predictive motion vector from among the values (f), (g), (h), (k) and (l) so that the selected value results in the smallest differential motion vector. Information of one bit, two bits or three bits is added.

As described above, when an interval between candidate values is large, it is highly likely that the magnitude of a differential motion vector is increased. Thus, when an intermediate value is added between the candidate values as a new option, it is highly likely that the prediction is accurately performed. Accordingly, the difference between the predictive motion vector and an actual vector is small, and it is possible to reduce the amount of coded bits.

In the aforementioned example, the intermediate value is added between the two types of the candidate values as a new option. However, any calculation method may be performed using candidate values. For example, a weighted mean calculation may be performed using multiple candidate values. In addition, a method for adding an option for the predictive motion vector is not limited. Moreover, in the aforementioned example, the method described with reference to FIG. 7 and the method described with reference to FIG. 8 are combined and used. However, each method described with reference to FIGS. 7 and 8 may be used independently.

Figures 9, 10:
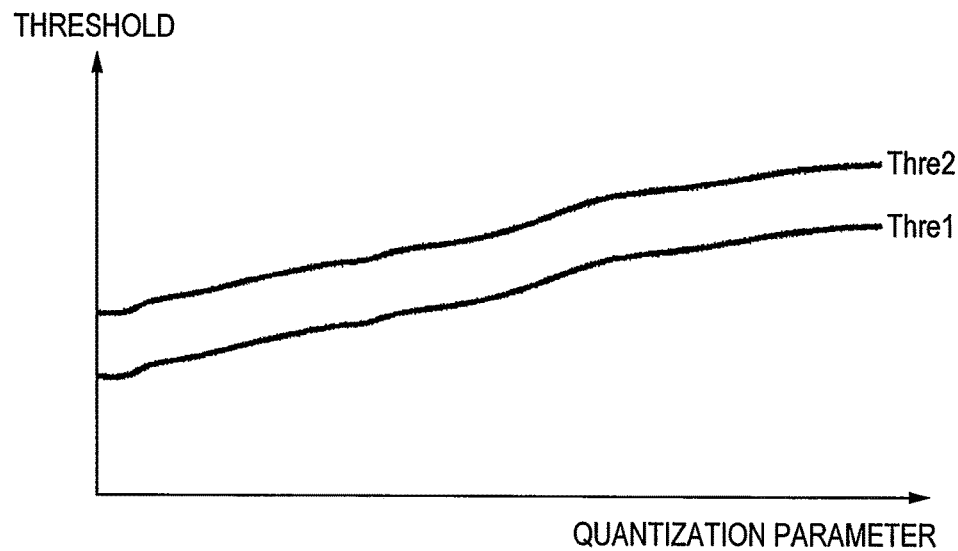
FIG. 9 is a diagram showing an example of a method for encoding a predictive motion vector according to the first embodiment of the present invention.
FIG. 10 is a diagram showing an example of thresholds that are used for the technique for predicting a motion vector according to the first embodiment of the present invention.

FIG. 9 shows a method for encoding the predictive motion vector. FIG. 9 shows variable length code tables that are used to encode the values in the cases CASE2, CASE4 and CASE5. The cases CASE2, CASE4 and CASE5 are representative examples in which the numbers of options are 2, 3 and 5. However, the variable length code tables are examples. A method for generating code tables is not limited.

In addition, a method for setting the thresholds Thre1 and Thre2 is not limited. The thresholds Thre1 and Thre2 may be fixed values. For example, when the thresholds are dynamically determined on the basis of a quantization parameter or the like as shown in FIG. 10, the thresholds are effective. In this example, the thresholds are set to larger values as the quantization parameter is larger. The reason is as follows. When the quantization parameter is large, the bit rate is small and an effect of the added bit or bits is large. Thus, when the thresholds are set to large values, it is unlikely that the added bit is generated. Therefore, the thresholds are effective.

In the embodiment of the present invention, the method for encoding a differential motion vector is switched among methods for encoding the differential motion vector on the basis of information selected from among the candidate vectors, and then the amount of coded bits is further reduced. FIG. 11 shows a method for estimating a characteristic of an image from information selected from among the candidate vectors. For example, when any of the components a, c and d of the candidate vectors is selected for a target block in order to encode and decode a predictive motion vector, it is apparent that a motion vector in a target region is similar to a vector of neighboring blocks, and it is estimated that the target region is present in a large object. When any of the components b and e of the candidate vectors is selected, two types of motions are present near a target region and it is estimated that the target region is located at a boundary portion of the large object. In contrast, when any of the components f, g, h, i, j, k and l of the candidate vectors is selected, correlations among motion vectors in regions located near a target region are low, and it is estimated that the target region is present in a non-correlation region that is, for example, a region in which many small objects are present.

FIG. 12 shows the method for switching a variable length code table for a differential motion vector on the basis of estimated information on a characteristic of an image as described above (information selected from among the candidate vectors). In general, when a motion is complicated, the accuracy of predicting a motion vector is reduced. In the aforementioned example, the prediction accuracy is reduced in order of "the region in the object", "the boundary region of the object" and "non-correlation region", and the magnitude of the differential motion vector is increased in the above order (1201). In the present invention, multiple variable length code tables (a table A (1202), a table B (1203) and a table C (1204)) are prepared, and a variable length code table is switched among the multiple variable length code tables on the basis of the characteristic of the table (1205). For example, as the table A, the following table is used: a table that results in the fact that when the value of the differential motion vector is small, a code length is small, and when the value of the differential motion vector is increased, the code length is abruptly increased. As the table C, in contrast, the following table is used: a table that results in the fact that when the value of the differential motion vector is small, the code length is large, and even when the value of the differential motion vector is increased, the code length is gently increased. Also, as the table B, a table that has an intermediate property of the tables A and C is used.

In this case, when the target region is present in the object (or when any of the components a, c and d of the candidate vectors is selected in order to encode and decode the predictive motion vector), the differential motion vector is encoded using the table A that is effective when the value of the differential motion vector is small. In contrast, when the target region is present in the non-correlation region (or when any of the components f, g, h, i, j, k and l of the candidate vectors is selected in order to encode and decode the predictive motion vector), the differential motion vector is encoded using the table C that is effective when the value of the differential motion vector is large. When the target region is located at a boundary portion of the object (or when any of the components b and e of the candidate vectors is selected in order to encode and decode the predictive motion vector), the differential motion vector is encoded using the table B that has the intermediate property of the tables A and C. In the aforementioned method, it is possible to accurately switch a code table on the basis of a characteristic of a target image and significantly reduce the amount of coded bits necessary for the differential motion vector.

Although any variable length code table may be used, it is effective to use a table A (1301), a table B (1302) and a table C (1303), which are shown in FIG. 13.

In this manner, the tables A, B and C may be defined as fixed tables in advance. For example, as shown in FIG. 14, it may be effective that multiple tables (tables 1 to 5) may be prepared (1402), and a table is dynamically selected from among the multiple tables on the basis of a parameter. In this example, combinations of table numbers that are assigned to the tables A, B and C are defined as table sets (a, b and c) (1401). A table set to be used is switched among the table sets on the basis of a cumulative value (PrevAddBits) of the added bit (or bits) for a frame that has been encoded and decoded immediately before a target image (1403). When a motion in a target frame is active, and code lengths of the tables A, B and C are largely biased, the effect of reducing the amount of coded bits is increased. Thus, tables are switched among the table sets on the basis of the parameter (PrevAddBits) that reflects the magnitude of a motion in the immediately previous frame. In this example, thresholds (Thre3 and Thre4) that are constant numbers are set in order to determine the switching. The method for determining the switching is not limited. In the aforementioned example, PrevAddBits is used as the parameter for the switching. A parameter such as the average value of motion vectors, a distribution value of the motion vectors, or prediction error statistics may be used as long as the parameter reflects the amount of a motion in a frame.

Figure 1:
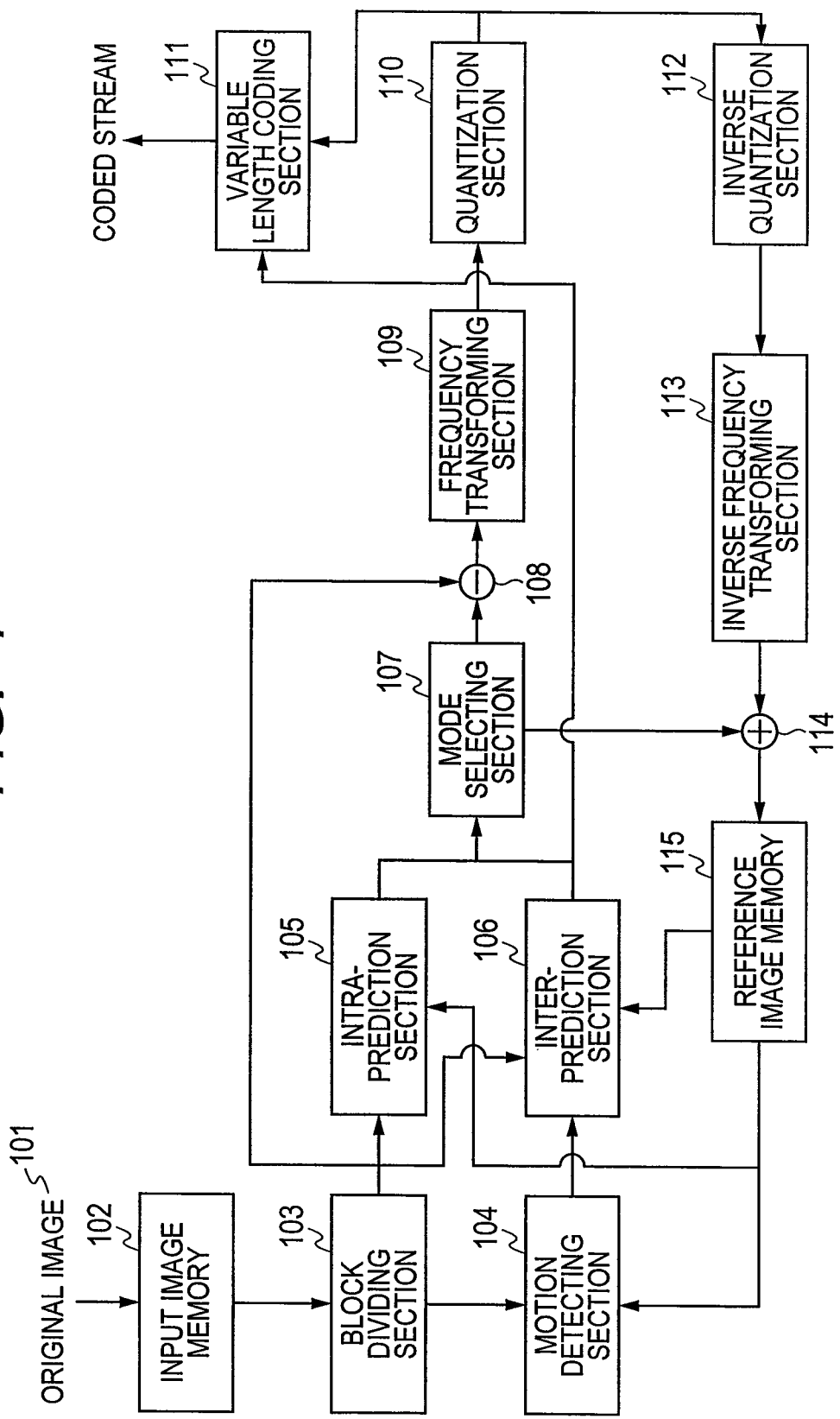
FIG. 1 is a block diagram showing a video encoding device according to a first embodiment of the present invention.

FIG. 1 shows an example of a video encoding device according to the present embodiment. The video encoding device includes: an input image memory (102) that holds an original image (101); a block dividing section (103) that divides the input image into small regions; an intra-prediction section (105) that performs intra-prediction on a block basis; an inter-prediction section (106) that performs inter-prediction on a block basis on the basis of the amount of a motion detected by a motion searching section (104); a mode selecting section (107) that determines prediction encoding means (prediction method and block size) that are suitable for a characteristic of an image; a subtracting section (108) that generates a prediction difference; a frequency transforming section (109) and a quantization section (110) that perform encoding on the prediction difference; a variable length coding section (111) that performs encoding on the basis of the possibility of generation of a code; an inverse quantization section (112) and an inverse frequency transforming section (113) that decode the encoded prediction difference; an adding section (114) that generates a decoded image using the decoded prediction difference; and a reference image memory (115) that holds the decoded image and uses the decoded image for subsequent prediction.

The input image memory (102) holds, as an image to be encoded, a single image included in the original image (101). The image to be encoded is divided into small blocks by the block dividing section (103). The block dividing section (103) transmits the blocks to the motion searching section (104), the intra-prediction section (105) and the inter-prediction section (106). The motion searching section (104) calculates the amount of a motion of each of the blocks using the decoded image stored in the reference image memory (115). The motion searching section (104) transmits motion vectors to the inter-prediction section (106). While the blocks are classified into some block sizes, the intra-prediction section (105) performs intra-prediction on the blocks on a block size basis and the inter-prediction section (106) performs inter-prediction on the blocks on a block size basis. The mode selecting section (107) selects the optimal prediction method from among the intra-prediction and the inter-prediction. Subsequently, the subtracting section (108) generates a prediction difference according to the optimal prediction encoding means and transmits the generated prediction difference to the frequency transforming section (109). The frequency transforming section (109) performs frequency transform such as discrete cosine transformation (DCT) on the transmitted prediction difference on a specified block size basis. Then, the quantization section (110) performs a quantization process on the transmitted prediction difference on the specified block size basis and transmits the prediction difference to the variable length coding section (111) and the inverse quantization section (112). The variable length coding section (111) performs variable length coding on prediction difference information represented by a frequency transform coefficient and on information necessary for decoding on the basis of the possibility of generation of a code, and generates a coded stream. In this case, the information that is necessary for decoding is, for example, a predicted direction used to perform the intra-prediction, a motion vector used to perform the inter-prediction, and the like. In the variable length coding process that is performed by the variable length coding section (111), a switching process is performed to select a variable length code table from among the variable length code tables shown in FIGS. 9, 11, 12, 13 and 14, for example. The inverse quantization section (112) performs inverse quantization on the quantized frequency transform coefficient. Then, the inverse frequency transforming section (113) performs inverse frequency transform such as inverse DCT (IDCT) on the frequency transform coefficient and acquires the prediction difference. Then, the inverse frequency transforming section (113) transmits the prediction difference to the adding section (114). Subsequently, the adding section (114) generates a decoded image. The decoded image is stored in the reference image memory (115).

Figure 2:
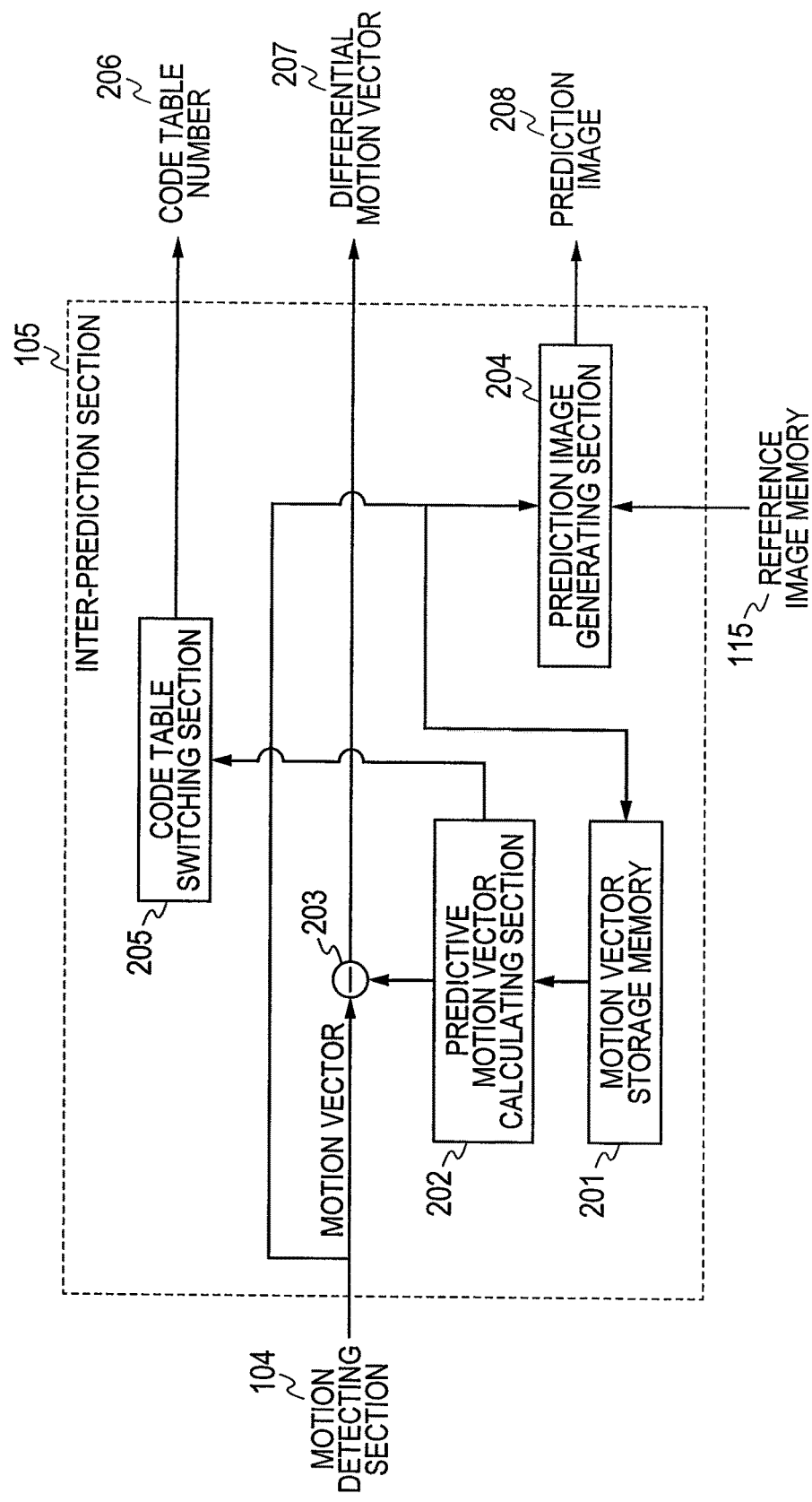
FIG. 2 is a block diagram showing an inter-prediction section included in the video encoding device according to the first embodiment of the present invention.

FIG. 2 shows an example of details of the inter-prediction section (106). The inter-prediction section includes: a motion vector storage memory (201) that stores motion vectors in encoded regions; a predictive motion vector calculating section (202) that calculates a predictive motion vector using the motion vectors in the encoded regions; a subtractor (203) that calculates a differential motion vector by calculating the difference between a motion vector and the predictive motion vector; a prediction image generating section (204) that generates a prediction image; and a code table switching section (205) that selects an optimal variable length code table on the basis of information selected from among predictive motion vectors.

The predictive motion vector calculating section (202) calculates a predictive motion vector of a target block on the basis of the motion vectors (in the encoded regions) stored in the motion vector storage memory (201). The process of calculating the predictive motion vector is described above with reference to FIGS. 7 and 8. The subtractor (203) calculates a differential motion vector (207) by calculating the difference between the motion vector calculated by the motion searching section (104) and the predictive motion vector. The code table switching section (205) selects an optimal variable length code table and outputs a code table number (206) of the optimal variable length code table to the variable length coding section (111). The prediction image generating section (204) generates a prediction image (208) from the motion vector and a reference image. The motion vector is stored in the motion vector storage memory (201).

Figure 3:
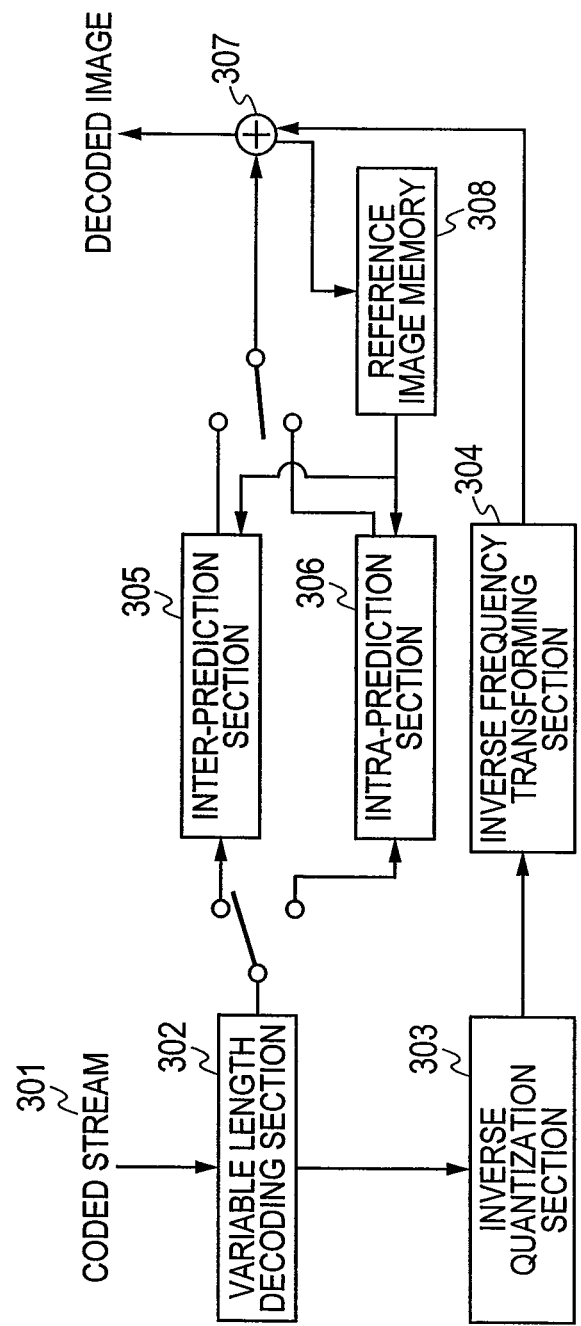
FIG. 3 is a block diagram showing a video decoding device according to the first embodiment of the present invention.

FIG. 3 shows an example of a video decoding device according to the present embodiment. For example, the video decoding device includes: a variable length decoding section (302) that performs variable length decoding on a coded stream (301) generated by the video encoding device shown in FIG. 1 so that processes of the variable length decoding are performed in inverse order of the processes of the variable length encoding; an inverse quantization section (303) and an inverse frequency transforming section (304) that are configured to decode a prediction difference; an inter-prediction section (305) that performs inter-prediction;

an intra-prediction section (306) that performs intra-prediction; an adding section (307) that acquires a decoded image; and a reference image memory (308) that temporarily stores the decoded image.

The variable length decoding section (302) performs variable length decoding on the coded stream (301) and acquires a frequency transform coefficient component of a prediction difference and information that is necessary for a prediction process. The information that is necessary for the prediction process includes a block size, a motion vector and the like.

In the variable length decoding process, the variable length decoding section (302) acquires decoded motion vectors of peripheral blocks from the motion vector storage memory (401) included in the inter-prediction section (305) described later, and aligns the candidate vectors shown in FIGS. 7 and 8. The variable length decoding section (302) calculates differences between the candidate vectors and determines a distribution of the candidate vectors from among the cases (CASE1 to CASE7). The variable length decoding section (302) selects a variable length code table from among the variable length code tables shown in FIG. 9 on the basis of the result of determining the distribution (from among the cases CASE1 to CASE7). The variable length decoding section (302) uses the selected variable length code table shown in FIG. 9 so as to determine an option indicated by the added bit (or bits) included in the coded stream. The variable length decoding section (302) uses the option indicated by the added bit (or bits) to select any of the variable length code tables shown in FIGS. 12, 13 and 14. In addition, the variable length decoding section (302) uses the selected variable length code table to perform the variable length decoding process on the differential motion vector.

Then, the variable length decoding section (302) transmits the former information on the prediction difference to the inverse quantization section (303). The variable length decoding section (302) transmits the latter information necessary for the prediction process to the inter-prediction section (305) or the intra-prediction section (306). Subsequently, the inverse quantization section (303) performs inverse quantization on the information on the prediction difference and the inverse frequency transforming section (304) performs inverse frequency transform on the information on the prediction difference, thereby performing decoding. Then, the inter-prediction section (305) or the intra-prediction section (306) references the reference image memory (308) on the basis of the information transmitted by the variable length decoding section (302), and performs the prediction process. The adding section (307) generates a decoded image and causes the decoded image to be stored in the reference image memory (308).

Figure 4:
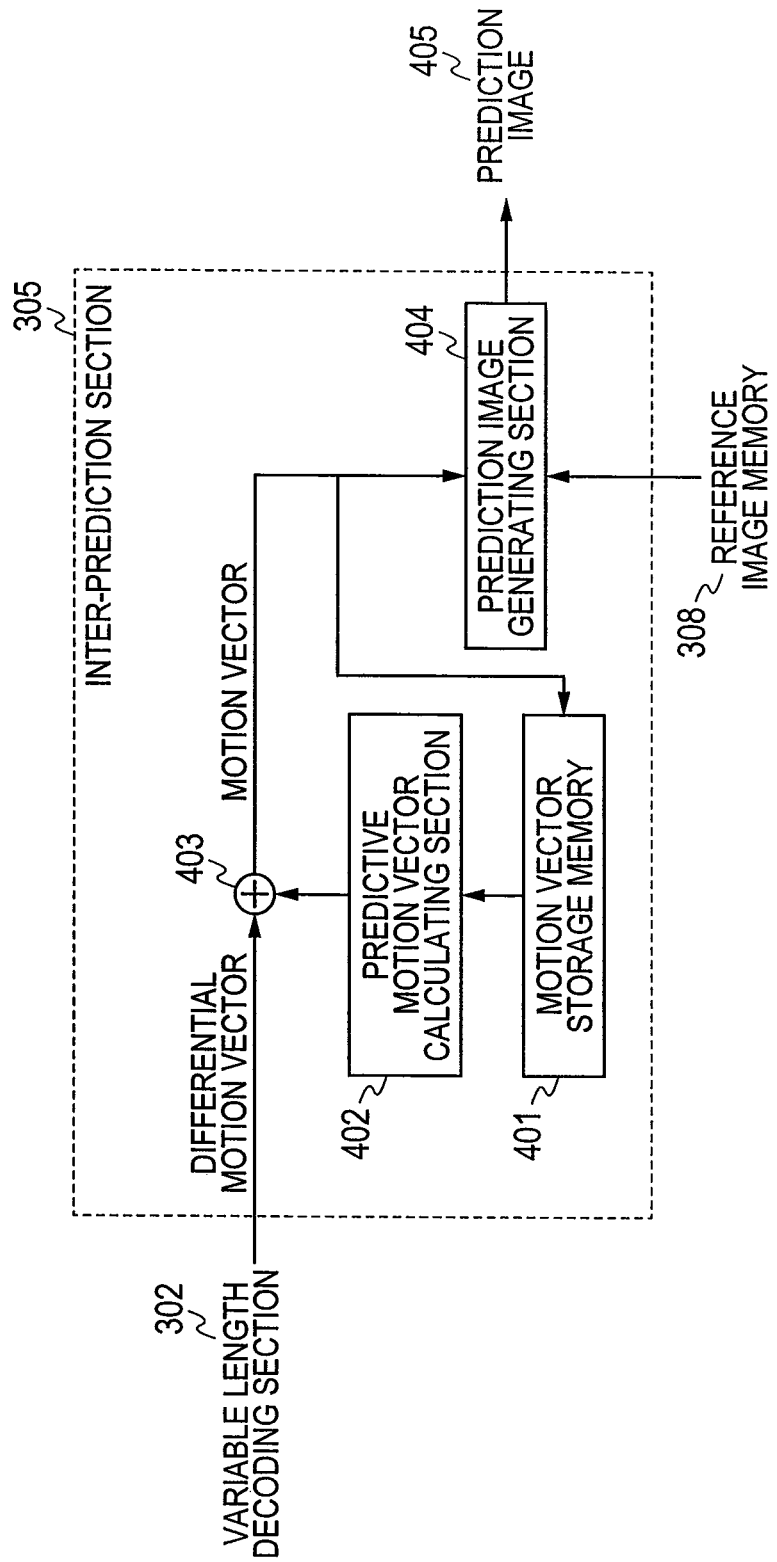
FIG. 4 is a block diagram showing an inter-prediction section included in the video decoding device according to the first embodiment of the present invention.

FIG. 4 shows an example of details of the inter-prediction section (305). The inter-prediction section includes: a motion vector storage memory (401) that stores motion vectors in decoded regions; a predictive motion vector calculating section (402) that calculates a predictive motion vector using the motion vectors in the decoded regions; an adder (403) that calculates a motion vector by calculating the sum of the differential motion vector and the predictive motion vector; and a prediction image generating section (404) that generates a prediction image.

The predictive motion vector calculating section (402) calculates a predictive motion vector of a target block on the basis of the motion vectors (in the decoded regions) stored in the motion vector storage memory (401). The process of calculating the predictive motion vector is described above with reference to FIGS. 7 and 8. The adder (403) calculates the sum of the differential motion vector decoded by the variable length decoding section and the predictive motion vector to thereby decode the motion vector. The decoded motion vector is stored in the motion vector storage memory (401), while the prediction image generating section (404) generates a prediction image (405) from the motion vector and the reference image.

Figure 16:
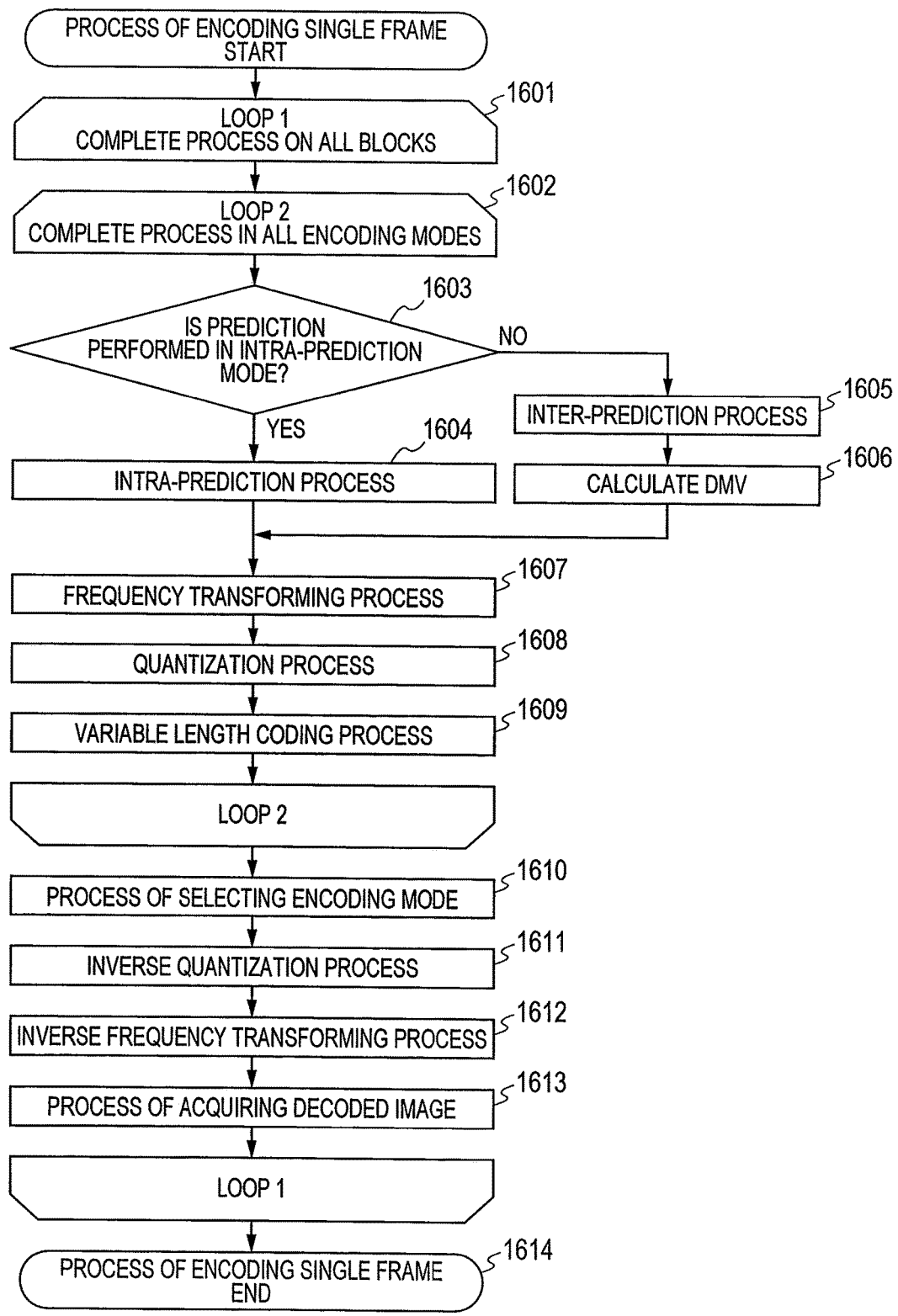
FIG. 16 is a flowchart of a video encoding method according to the first embodiment of the present invention.

FIG. 16 shows steps of a process of encoding a single frame according to the present embodiment. The following process is performed on all blocks (1601) included in the frame to be encoded. Specifically, prediction is performed on a corresponding block in all encoding modes (combinations of prediction methods and block sizes) (1602). The intra-prediction (1604) or the inter-prediction (1605) is performed on the basis of the prediction method (1603), thereby calculating the prediction difference (difference image). In the inter-prediction, the prediction difference (difference image) and a motion vector are encoded. In this case, the differential motion vector DMV is calculated (1606) on the basis of the predictive motion vector PMV calculated using the methods shown in FIGS. 7 and 8. Then, a frequency transforming process (1607) is performed on the prediction difference, and then a quantization process (1608) is performed on the prediction difference. Then, the variable length coding process (1609) is performed using the variable length coding tables shown in FIGS. 9, 11, 12, 13 and 14 and the process of switching the variable length coding tables, and then distortion of an image and the amount of coded bits in each of the encoding modes are calculated. When the aforementioned process is completed in each of all the encoding modes, a mode in which the encoding efficiency is highest is selected from among the encoding modes on the basis of the results of the process (1610). It is possible to select a mode in which the encoding efficiency is highest from among the encoding modes when RD-optimization scheme is used. In RD-optimization scheme, the optimal encoding mode is selected on the basis of the relationship between the distortion of the image and the amount of the coded bits. For details of RD-optimization scheme, refer to Reference Document 2.

[Reference Document 2] G. Sullivan and T. Wiegand: "Rate-Distortion Optimization for Video Compression", IEEE Signal Processing Magazine, vol. 15, no. 6, pp. 74-90, 1998.

Subsequently, an inverse quantization process (1611) and an inverse frequency transforming process (1612) are performed on the quantized frequency transform coefficient in the selected encoding mode, and then the prediction difference is decoded and a decoded image is generated. The decoded image is stored in the reference image memory (1613). The aforementioned process is performed on all the blocks. Then, the encoding of the single image frame is completed (1614).

Figure 17:
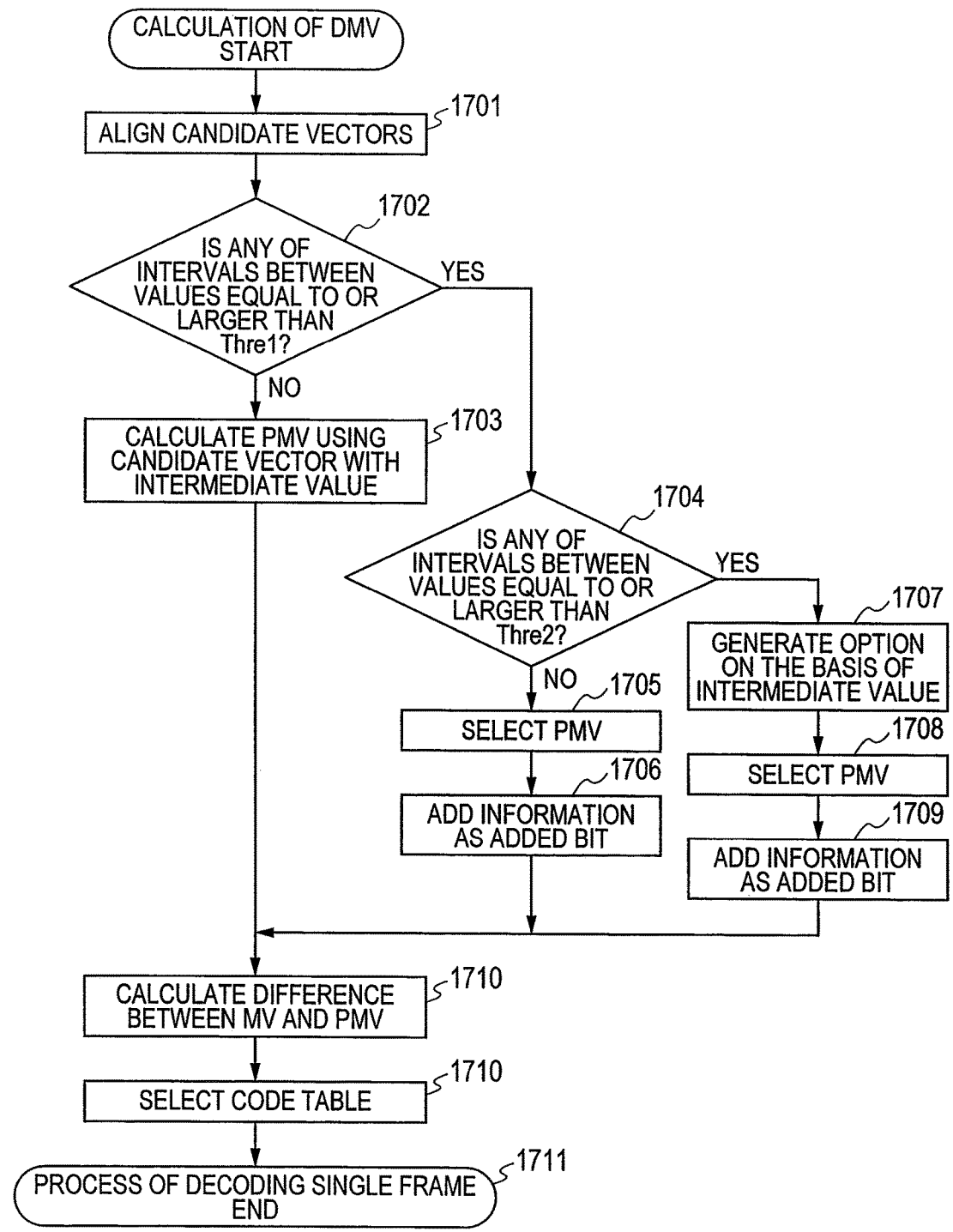
FIG. 17 is a flowchart of a process of calculating a differential motion vector in the video encoding method according to the first embodiment of the present invention.

FIG. 17 shows steps of a process (1606) (shown in FIG. 16) of calculating the differential motion vector DMV in detail. First, vectors (candidate vectors) of blocks located near a target block are aligned (1701). In the present embodiment, the "alignment" means that the maximum value, a median and the minimum value are calculated from values of components of the multiple candidate vectors in a predetermined direction, and a vector with the maximum value, a vector with the median and a vector with the minimum value are determined. Alignment described below applies the same. It is determined whether or not intervals between the values of the components of the multiple candidate vectors in the predetermined direction are equal to or larger than the threshold Thre1 (1702). When the intervals between the values of the components of the multiple candidate vectors in the predetermined direction are smaller than the threshold Thre1, a predictive motion vector PMV is calculated using the candidate vector that has the median (1703) in a similar manner to the conventional prediction method. In contrast, when any of the intervals between the values of the components of the multiple candidate vectors in the predetermined direction is equal to or larger than the threshold Thre1, it is determined whether or not the intervals between the values of the components of the multiple candidate vectors in the predetermined direction are equal to or larger than the threshold Thre2 (1704). When the intervals between the values of the components of the multiple candidate vectors in the predetermined direction are smaller than the threshold Thre2, a candidate vector is selected as the predictive motion vector PMV from among the candidate values that are options so that the differential motion vector is smallest (1705). The selected information is added as the added bit or bits (1706). In contrast, when any of the intervals between the values of the components of the multiple candidate vectors in the predetermined direction is equal to or larger than the threshold Thre2, an intermediate value among the candidate values is calculated, and another option for the prediction value is generated (1707). Then, a candidate vector is selected as the predictive motion vector PMV from among the candidate values that are options so that the differential motion vector is smallest (1705). The selected information is added as the added bit or bits (1706). The predictive motion vector PMV is calculated by the aforementioned process. After that, the difference between the motion vector MV and the predictive motion vector PMV is calculated as the differential motion vector DMV (1710). A code table for the differential motion vector DMV is selected on the basis of the selected predictive motion vector PMV (1710). When the aforementioned process is completed, the process of calculating the differential motion vector DMV is completed (1711). In the aforementioned process, the process of calculating the predictive motion vector corresponds to the process (shown in FIGS. 7 and 8) of calculating the predictive motion vector.

Figure 18:
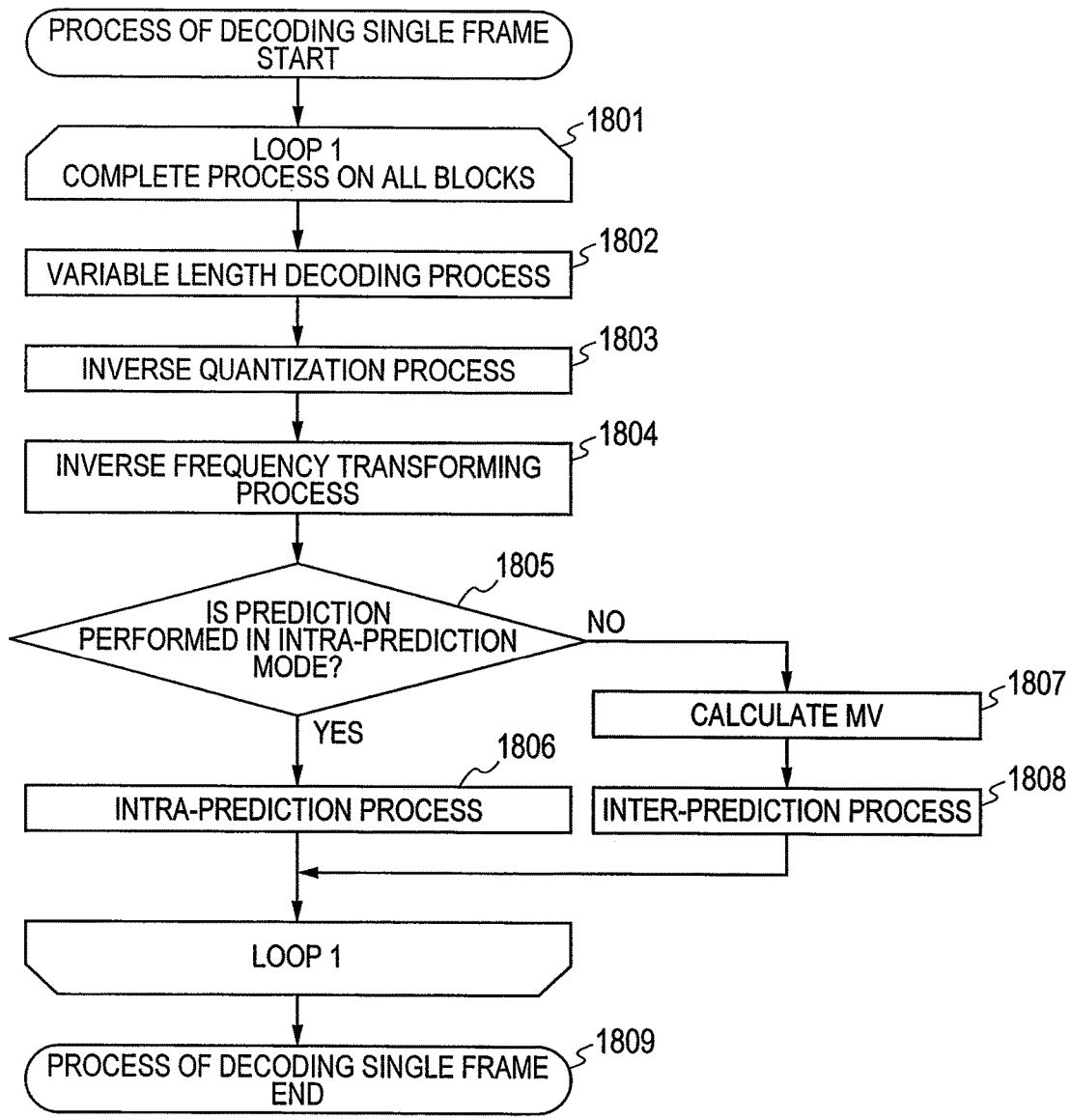
FIG. 18 is a flowchart of a video decoding method according to the first embodiment of the present invention.

FIG. 18 shows steps of a process of decoding a single frame according to the present embodiment. The following process is performed on each of all the blocks of the single frame (1801). Specifically, the variable length decoding process is performed on an input stream, and then the frequency transform coefficient component of the prediction difference and the differential motion vector are decoded (1802).

Figure 8:
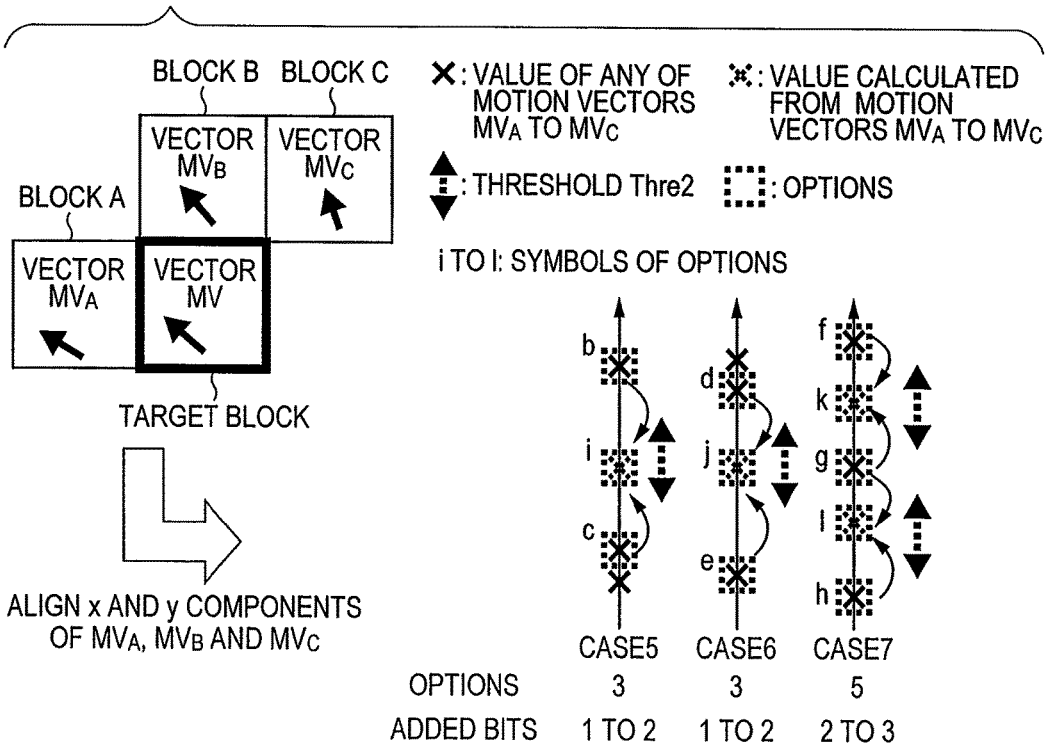
FIG. 8 is a conceptual diagram showing an example of another technique for predicting a motion vector according to the first embodiment of the present invention.

In the variable length decoding process, motion vectors of decoded blocks located near the target block are acquired and the candidate vectors shown in FIGS. 7 and 8 are aligned. Then, differences between the candidate vectors are calculated. A distribution of the candidate vectors is determined from among the cases CASE1 to CASE7. A variable length code table is selected from among the variable length code tables shown in FIG. 9 on the basis of the result of determining the distribution (any of the cases CASE1 to CASE7). An option indicated by the added bit (or bits) included in the coded stream is identified using the selected code table shown in FIG. 9. A variable length code table is selected from among the variable length code tables shown in FIGS. 12, 13 and 14 using the option indicated by the added bit or bits. In addition, the variable length decoding process is performed on the differential motion vector using the selected variable length code table.

Next, the inverse quantization process (1803) and the inverse frequency transforming process (1804) are performed on the frequency transform coefficient component of the prediction difference acquired in the variable length decoding process, and then the prediction difference (differential image) is decoded. Subsequently, the intra-prediction (1806) and the inter-prediction (1808) are performed on the basis of the prediction method (1805). Before the inter-prediction is performed, the motion vector MV is decoded. The differential motion vector DMV is decoded in the variable length decoding process (1802). The differential motion vector DMV and the predictive motion vector PMV calculated by the methods shown in FIGS. 7 and 8 are summed, and the motion vector MV is calculated (1807). The inter-prediction process (1808) is performed using the calculated motion vector MV. The aforementioned process is performed on each of all the blocks of the frame. Then, the decoding of the single image frame is completed (1809).

Figure 19:
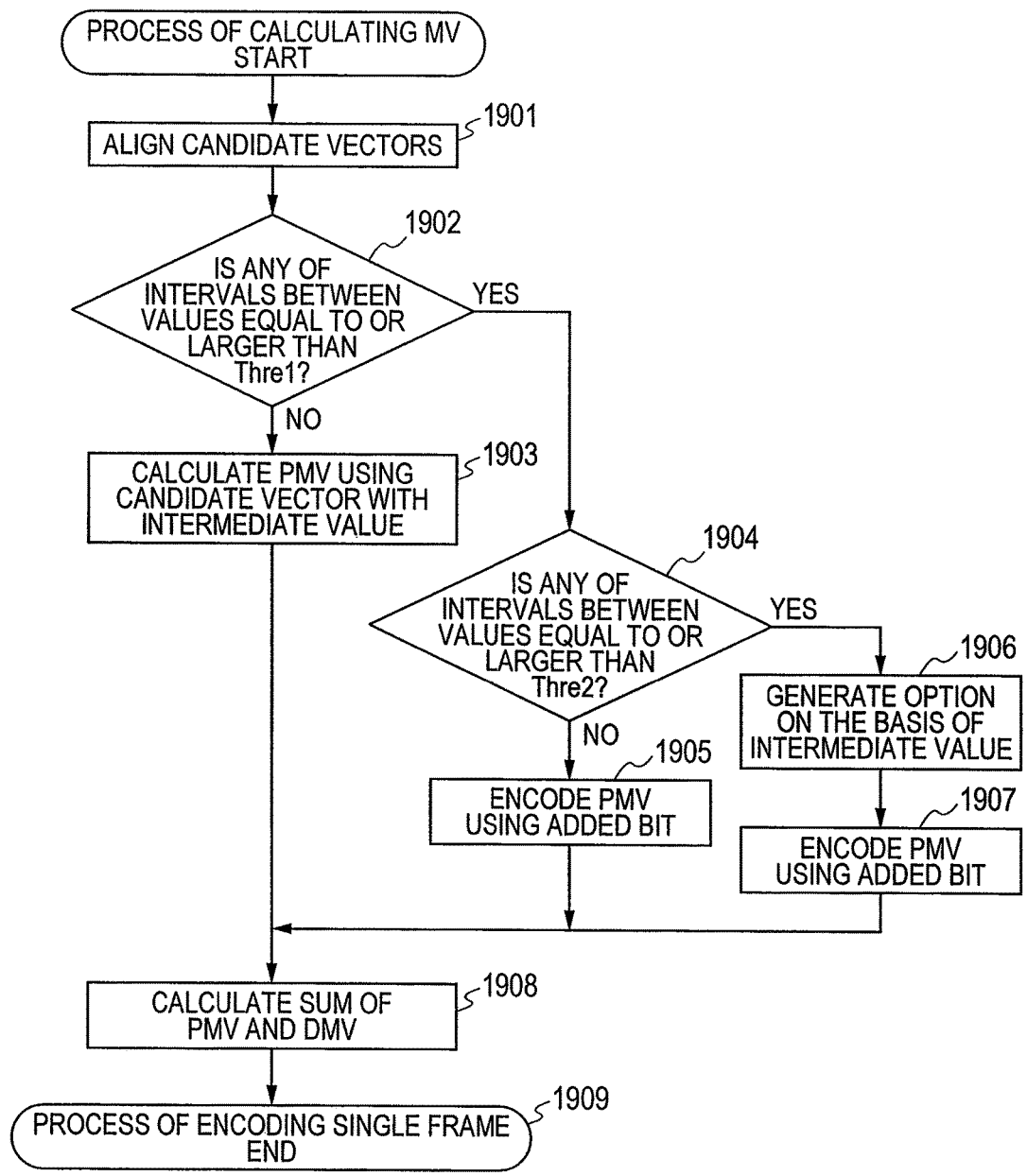
FIG. 19 is a flowchart of a process of calculating a motion vector in the video decoding method according to the first embodiment of the present invention.

FIG. 19 shows steps of the process (1807) (shown in FIG. 18) of calculating the motion vector MV in detail. First, vectors (candidate vectors) of blocks located near the target block are aligned (1901). It is determined whether or not intervals between the values of the components of the candidate vectors in the predetermined direction are equal to or larger than the threshold Thre1 (1902). When the intervals between the values of the components of the candidate vectors in the predetermined direction are smaller than the threshold Thre1, a predictive motion vector PMV is calculated using the candidate vector that has the median (1903) in a similar manner to the conventional prediction method. In contrast, when any of the intervals between the values of the components of the candidate vectors in the predetermined direction is equal to or larger than the threshold Thre1, it is determined whether or not the intervals between the values of the components of the candidate vectors in the predetermined direction are equal to or larger than the threshold Thre2 (1904). When the intervals between the values of the components of the candidate vectors in the predetermined direction are smaller than the threshold Thre2, the added bit (or bits) is read and a value selected as the predictive motion vector PMV is specified so that the predictive motion vector PMV is decoded (1905). When any of the intervals between the values of the components of the multiple candidate vectors in the predetermined direction is equal to or larger than the threshold Thre2, an intermediate value among the candidate values is calculated, and another option for the prediction value is generated (1906). Subsequently, the added bit (or bits) is read and the value selected as the predictive motion vector PMV is specified, thereby decoding the predictive motion vector PMV (1907). The predictive motion vector PMV is calculated by the aforementioned process. After that, the sum of the predictive motion vector PMV and the differential motion vector DMV is calculated as the motion vector MV (1908). Then, the calculation of the motion vector MV is completed (1909).

In the present embodiment, the predictive motion vector is calculated on a block basis. However, for example, the predictive motion vector may be calculated on an object basis, while objects are separated from a background of an image. In addition, DCT is used as an example of frequency transform. However, any orthogonal transform (such as discrete sine transformation (DST), wavelet transformation (WT), discrete Fourier transformation (DFT), or Karhunen-Loeve transformation (KLT)) that is used for removal of inter-pixel correlation may be used as frequency transform.

In addition, the predictive difference may be encoded without frequency transform. Furthermore, variable length coding may not be performed.

In the first embodiment, the three types of peripheral vectors are used for the target block as the candidate values for the predictive motion vector. The number of candidate values is not limited. Four or more types of peripheral vectors may be used as candidate values.

In the video encoding device, the video encoding method, the video decoding device and the video decoding method according to the first embodiment of the present invention described above, it is possible to achieve a video encoding method and a video decoding method in which the amount of coded bits for a motion vector is reduced and the compression efficiency is improved.

Second Embodiment

A second embodiment of the present invention is described below.

In the first embodiment, the number of vectors used as candidate of predictive motion vectors is three. In the second embodiment, as a simpler method, the number of vectors used as candidate of predictive motion vectors is two.

A video encoding device according to the second embodiment is different from the video encoding device (shown in FIGS. 1 and 2) according to the first embodiment only in the method for calculating a predictive motion vector PMV. Thus, other configurations and operations of the video encoding device according to the second embodiment are described above in detail, and a description thereof is omitted.

In addition, a video decoding device according to the second embodiment is different from the video decoding device (shown in FIGS. 3 and 4) according to the first embodiment only in the method for calculating a predictive motion vector PMV. Thus, the other configurations and operations of the video decoding device according to the second embodiment are described above in detail, and a description thereof is omitted.

In addition, a video encoding method according to the second embodiment is different from the video encoding method (shown in FIG. 16) according to the first embodiment only in a method for calculating a differential motion vector DMV. Thus, other processes are described above in detail and a description thereof is omitted.

In addition, a video decoding method according to the second embodiment is different from the video decoding method (shown in FIG. 18) according to the first embodiment only in a method for calculating a motion vector MV. Thus, other processes are described above in detail and a description thereof is omitted.

Figure 15:
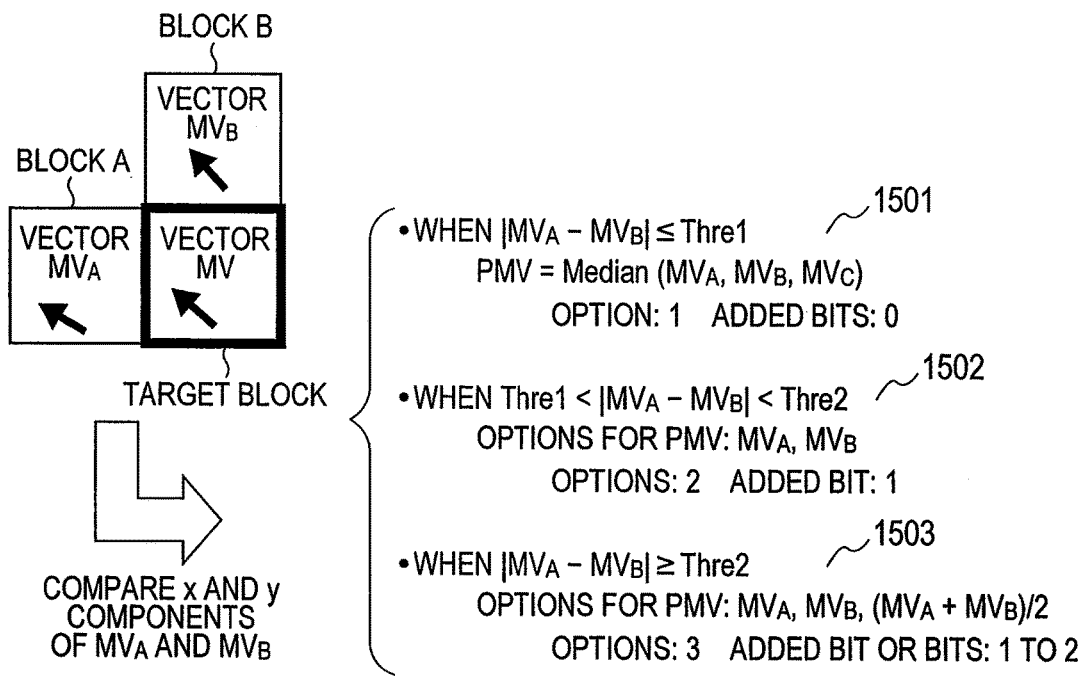
FIG. 15 is a conceptual diagram showing a technique for predicting a motion vector according to a second embodiment of the present invention.

The method for calculating a predictive motion vector PMV according to the second embodiment is described below with reference to FIG. 15. FIG. 15 is a conceptual diagram showing an example of the method for calculating a predictive motion vector PMV according to the present embodiment. In this example, as candidate of predictive motion vectors, two types of the following vectors are used: a motion vector of a block A located on the left side of a target block; and a motion vector of a block B located on the upper side of the target block. In this case, the motion vector of the block A is indicated by MVA, while the motion vector of the block B is indicated by MVB. In this example, in order to calculate a predictive motion vector, a block C (a motion vector MVC) that is located on the upper right side of the target block and another block may be used.

First, x and y components of the motion vectors MVA and MVB are compared. When the difference between values of the motion vectors MVA and MVB is equal to or lower than the threshold Thre1, and any of the values is selected, the differential motion vector does not significantly vary. Thus, in a similar manner to H.264/AVC format, the median of the motion vectors MVA and MVB is selected as the predictive motion vector PMV (1501). In this case, an added bit is not generated. In this case, the median may not be used, and the average value, the maximum value, the minimum value or the like may be used for the calculation. In addition, in this case, a motion vector (such as the motion vector of the block located on the upper left side of the target block, a motion vector of a block that is located at the same position as the target block and included in a frame that chronologically precedes a frame that includes the target block) of a block other than the block A and B may be used.

When the difference between the values of the motion vectors MVA and MVB is a value between the threshold Thre1 and the threshold Thre2, the two motion vectors MVA and MVB are options for the predictive motion vector, and any of the motion vectors MVA and MVB is selected as the predictive motion vector PMV so that the differential motion vector is smaller. One-bit information is added. When the difference between the values of the motion vectors MVA and MVB is equal to or larger than the threshold Thre2, the three motion vectors MVA, MVB and (MVA+MVB)/2 are options for the predictive motion vector, and any of the three motion vectors is selected as the predictive motion vector PMV so that the differential motion vector is smallest. Information of one or two bits is added.

In the video encoding device and the video encoding method according to the second embodiment, the differential motion vector DMV is calculated by calculating the difference between the motion vector MV calculated by the inter-prediction and the predictive motion vector PMV calculated as described above, and the video encoding process is performed.

In the video decoding device and the video decoding method according to the second embodiment, the motion vector MV is calculated by adding the differential motion vector DMV decoded from the coded stream to the calculated predictive motion vector PMV, the inter-prediction process is performed on the motion vector MV, and the video decoding process is performed.

In the present embodiment, the predictive motion vector is calculated on a block basis. The predictive motion vector may be calculated on an object basis, while objects are separated from a background of an image. In addition, DCT is used as an example of frequency transform. However, any orthogonal transform (such as discrete sine transformation (DST), wavelet transformation (WT), discrete Fourier transformation (DFT), or Karhunen-Loeve transformation (KLT)) that is used for removal of inter-pixel correlation may be used as frequency transform. In addition, the prediction difference may be encoded without frequency transform. Furthermore, variable length coding may not be performed.

In the video encoding device, the video encoding method, the video decoding device and the video decoding method according to the second embodiment of the present invention, it is possible to simplify the processes and reduce the throughput in addition to the effects of the first embodiment.

DESCRIPTION OF REFERENCE NUMERALS

102 . . . Input image memory, 103 . . . Block dividing section, 104 . . . Motion searching section, 105 . . .

Intra-prediction section, 106 . . . Inter-prediction section, 107 . . . Mode selecting section, 108 . . . Subtracting section, . . . Frequency transforming section, 110 . . . Quantization section, 111 . . . Variable length coding section, 112 . . . Inverse quantization section, 113 . . . Inverse frequency transforming section, 114 . . . Adding section, 115 . . . Reference image memory, 302 . . . Variable length decoding section, 303 . . . Inverse quantization section, 304 . . . Inverse frequency transforming section, 305 . . . Inter-prediction section, 306 . . . Intra-prediction section, 307 . . . Adding section, 308 . . . Reference image memory

What is claimed:

1. A video decoding method comprising the steps of:

selecting a prediction mode to be performed among a plurality of prediction modes including an intra-prediction mode and an inter-prediction mode;

calculating a predictive motion vector, in case that the inter-prediction mode is selected as the prediction mode to be performed;

calculating a motion vector by summing the predictive motion vector calculated in the predictive motion vector calculating step and a differential motion vector decoded from a coded stream, in case that the inter-prediction mode is selected as the prediction mode to be performed; and performing an inter-prediction process of the selected prediction mode using the motion vector calculated in the motion vector calculating step, in case that the inter-prediction mode is selected as the prediction mode to be performed, wherein the predictive motion vector calculating step includes:

a first process to select a plurality of candidate blocks among blocks decoded prior to a block to be decoded, the candidate blocks are selected from five or more blocks, the five or more blocks including peripheral blocks in the same frame as the block to be decoded and blocks in a different frame from the block to be decoded, a second process to use any one of a first value and a second value when a difference between the first value and the second value in motion vector values of the plurality of candidate blocks is within a predetermined threshold, a third process to make a motion vector list listing a plurality of motion vector values including the motion vector value of the first value or the second value selected in the second process and a motion vector value other than the first value and the second value in the motion vector values of the plurality of candidate blocks selected in the first process, a fourth process to retrieve selection information from the coded stream, and a fifth process to select one motion vector value among the plurality of motion vector values listed in the motion vector list, wherein the one motion vector value selected from the plurality of motion vector values listed in the motion vector list is determined based on the selection information regardless of the differential motion vector, wherein the number of the plurality of motion vector values listed in the motion vector list is smaller than five, and wherein the peripheral blocks in the same frame as the block to be decoded, referred to in the first process includes a peripheral block, located at an upper side of the block to be decoded and a peripheral block located at a left side of the block to be decoded.

2. A method comprising:

selecting a prediction mode to be performed among a plurality of prediction modes including an intra-prediction mode and an inter-prediction mode;

calculating a predictive motion vector in case the inter-prediction mode is selected as the prediction mode to be performed;

calculating a motion vector by summing the calculated predictive motion vector and a differential motion vector decoded from a coded stream, in case the inter-prediction mode is selected as the prediction mode to be performed; and performing an inter-prediction process of the selected prediction mode using the calculated motion vector in case the inter-prediction mode is selected as the prediction mode to be performed, wherein the calculating the predictive motion vector includes:

selecting a plurality of candidate blocks among blocks decoded prior to a block to be decoded, the candidate blocks being selected from five or more blocks, the five or more blocks including peripheral blocks in the same frame as the block to be decoded and blocks in a different frame from the block to be decoded, using one of a first value or a second value when a difference between the first value and the second value in motion vector values of the plurality of candidate blocks is within a predetermined threshold, generating a motion vector list listing a plurality of motion vector values including the motion vector value of the first value or the second value, and a motion vector value other than the first value and the second value in the motion vector values of the plurality of candidate blocks, retrieving selection information from the coded stream, and selecting one motion vector value among the plurality of motion vector values listed in the motion vector list, wherein the one motion vector value selected from the plurality of motion vector values listed in the motion vector list is determined based on the selection information regardless of the differential motion vector, wherein the number of the plurality of motion vector values listed in the motion vector list is smaller than five, and wherein the peripheral blocks in the same frame as the block to be decoded, referred to in the selecting the plurality of candidate blocks, includes a peripheral block located at an upper side of the block to be decoded and a peripheral block located at a left side of the block to be decoded.

* * * * *